April 20, 1954   C. H. McCONNELL   2,676,038
SEALED FLEXIBLE CONNECTOR FOR DUCTS
Filed Dec. 1, 1952
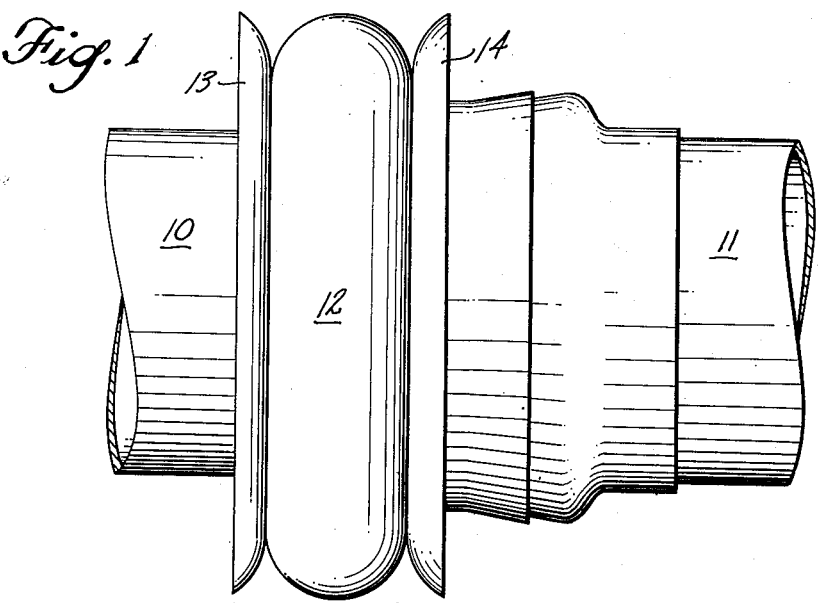
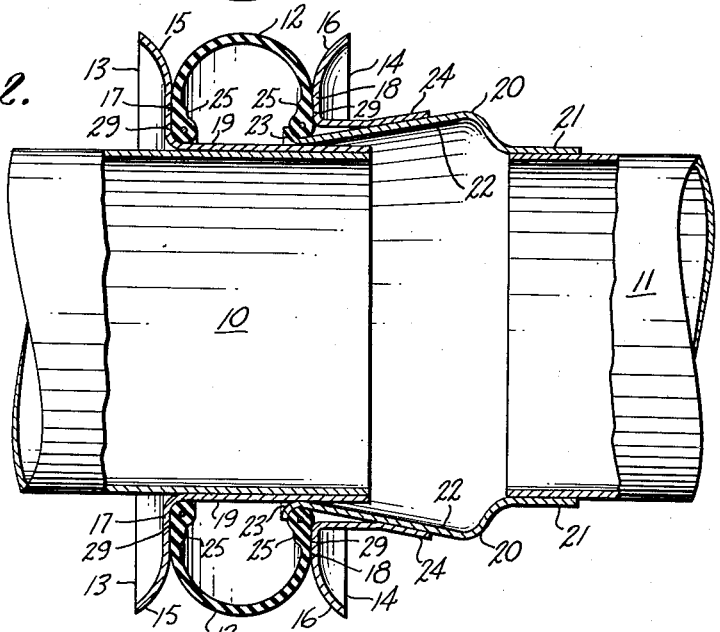
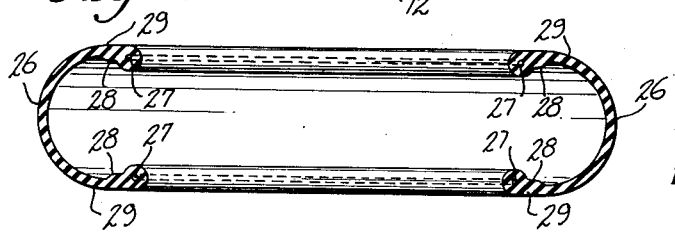
INVENTOR.
CHARLES H. McCONNELL
BY Roy Mattern Jr.
ATTORNEY Patented Apr. 20, 1954

2,676,038

UNITED STATES PATENT OFFICE 2,676,038

SEALED FLEXIBLE CONNECTOR FOR DUCTS

Charles H. McConnell, Seattle, Wash., assignor to Boeing Airplane Company, Seattle, Wash., a corporation of Delaware Application December 1, 1952, Serial No. 323,342

1 Claim. (Cl. 285—90)

This invention relates to sealed flexible connections between sections of a conduit, duct, pipe or pressure vessel having internal positive pressure where vibratory and/or expansive forces are causing relative angular and/or axial motion between the sections.

The invention comprises two specially formed flanges respectively secured to sections of a fluid system so that they form cooperating close fitting extensions of the sections and in addition form an outer circumferential channel recess to receive and hold a sealing member that is tire-like in appearance forming a circumferential seal around each respective flange when subjected to internal positive pressure.

The purpose of the invention is to provide a sealed flexible connection for conduit, duct pipe or pressure vessel sections, which will remain sealed under severe pressure and temperature conditions in the presence of substantial relative multi-directional movement between the sections.

It is an object of the invention to provide the equivalent of both a flexible section and a sealing connector in one unit.

It is an object of the invention to provide a flexible sealing connector that does not require any clamping forces.

It is an object of the invention to provide a flexible sealing connector wherein the sealing member is protected from flow erosion.

It is an object of the invention to provide a flexible sealing connector with telescoping portions that form a substantial seal thereby avoiding complete failure upon rupture of the sealing member.

The purpose and objects of the invention will be more fully understood as the following detailed description is read with reference to the drawing, in which:

Figure 1 is a view of the exterior of the sealed flexible connection,

Figure 2 is a sectional view of the sealed flexible connection of Figure 1, and

Figure 3 is a sectional view of another embodiment of the sealing member of Figures 1 and 2.

The preferred construction as presented in Figures 1 and 2 is shown as the sealed flexible connection between sections of an air bleed manifold of an airplane jet engine and its outflow duct. This represents a general application for the invention. There is relative vibratory movement and thermal expansion between the sections which direct the flow of air under 100 p. s. i. g. at a temperature of 600° F.

The connection for installation under these conditions is tested to withstand:

(1) Up to 10° of axial misalignment,
(2) Up to 300 p. s. i. g. internal pressure,
(3) Up to 600° F. inside fluid temp. (250° ambient temp.),
(4) Up to 50% repeated compression of the sealing member, with the leakage not exceeding 0.2 cu. ft./min. (standard conditions) at any time during the test period of 100 hours or more.

To more fully explain the construction of this sealed flexible connection, reference numbers are employed throughout the figures. In Figure 1, the sections that are connected and sealed are 10 and 11. The sealing member 12 is positioned by the flanges 13 and 14 that move independently of each other but directly with their respective sections 10 and 11.

Additional refinements may be more readily observed in the sectional view of Figure 2. The flanges 13 and 14 are formed:

(1) To position the seal 12,
(2) To form a secondary partial seal by the interfitting of their telescopic extensions, and
(3) To provide for multi-directional movement.

Each flange 13 and 14 has a respective radially extending surface somewhat rounded at its outer diameter as noted at 15 and 16 for aiding assembly and improving heat radiation. The inner portions of the flanges at 17 and 18 are in radial planes which are perpendicular to the respective axes of the fluid sections 10 and 11. Therefore, when the axes are aligned, the radial planes of the flanges are parallel to one another. As will be noted later, the portions 17 and 18 of the flanges 13 and 14 serve as the contacting surfaces that complement the sealing member 12 to form the seals.

Both flanges 13 and 14 have axially extending portions which overlap one another forming a telescopic fit which is a substantial seal and invaluable upon the structural failure of the sealing member 12.

The axial extending portion 19 of flange 13 is cylindrical having an inside diameter to match the outer diameter of the fluid section 10 permitting their permanent attachment to one another. The end of portion 19 terminates at the end of section 10 which necessarily locates the flange 13 at a spaced distance from the end of section 10. The sealing construction is built around this outer surface of the portion 19.

Flange 14 has an axial extending portion which extends in both directions from the flange 14 and for convenience of manufacture, it is formed in two pieces.

The basic piece 20 is especially formed providing:

(1) An overlapping cylinder portion 21 for permanent attachment to the fluid section 11 which is positioned apart from fluid section 10;

(2) An expanded portion 22 abruptly increasing in diameter and then more gradually decreasing in diameter as the portion extends from the fluid section 11 to overlie the cylindrical extension 19 of flange 13, thereby establishing a clearance volume to accommodate the fluid section 10 when multi-directional relative movement occurs; and also (3) The rounded minimum diameter portion 23 at the terminus of the portion 22 which closely overlies the fluid section 10 and its attached flange extension 19 to establish the secondary partial seal, and which determines the pivot location when angular movement occurs.

The other piece 24 of the axial extension of flange 14 surrounds the clearance volume portion 22 of the basic piece 20. Its place of attachment is controlled by its design objective of positioning its integrally attached flange 14 so the latter will cooperate with the rounded portion 23 on piece 20 to snugly grip a sidewall portion 25 of the sealing member 12, associating the seal 12 with the flange assembly 14 for convenience of handling and for protection of the sidewall 25 during assembly of the two flange sections 13 and 14.

The sealing member 12 that is closely fitted between the flanges 13 and 14 and which has sidewall portion 25 positioned with flange 14 as just noted, is formed in such a manner to resemble the shape of a tire. Its cross-section appears U-shaped and the termination of the sidewalls of the U are expanded on the inside to acquire added reinforcement. Figure 3, a section through a sealing member 26 similar to the member 12 of Figures 1 and 2, shows additional reinforcement in the form of circular bead wires 27, 27 inserted within the sidewalls 28, 28.

The outer surfaces 29 of the sidewalls 25, 25 or the sidewalls 28, 28 of either sealing member 12 or 26, are formed to closely abut the inner diameter surfaces 17 and 18 of the flanges 13 and 14 when subjected to internal pressure, thus establishing the fluidtight seals that withstand the flexures, temperatures and pressures that are encountered.

When the sealed flexible connection is assembled in accordance with the construction features described, the hot fluids under pressure that are injected into the fluid system pass readily through the unobstructed openings of the connection. The eddying volumes of the hot fluid are restrained from departing from the channel of flow both by the secondary seal formed by the telescoping portions 19 and 20 and by the sealing member 12 which is removed from the turbulence that accompanies the major quantity of the fluid flow thereby establishing the primary seal which absolutely thwarts the escape of the hot fluids.

The materials presently considered as the best for incorporation into the components of the sealed flexible connection that is illustrated and described in this specification in conjunction with the sections of an air bleed manifold of an airplane jet engine and its out flow duct are the following:

The sealing member is manufactured by building up layers of fiber glass cloth which are impregnated and bonded together by employing silicone rubber. The number of plies used and the possible use of bead reinforcement members is dependent on the strength requirements that are specified.

The flanges and their appurtenant extensions are formed of annealed corrosion resistant steel.

The sealed flexible connection formed by following the basic considerations underlying this design is compact, lightweight, extremely durable, highly effective, easily assembled, readily inspected, and quickly manufactured at low cost.

I claim:

A multi-piece flexible sealed connector for continuing a fluid passageway from one duct section to another section comprising two overlapping sleeves each connected to a respective duct section, one sleeve of variable diameter to provide a restricted entrance forming a partial seal between the sleeves and an enlarged chamber forming a deflection space to accommodate multi-directional deflection and movement between the sleeves attached to the respective duct sections, radial flanges on both sleeves spaced to form an annular outer groove extending in width on either side of the restricted sleeve entrance, a rolled back portion of the variable diameter sleeve located at its entrance to establish an annular recess in conjunction with the radial flange of the variable diameter sleeve, and a tire-like circumferential seal made of layers of fiber glass impregnated and bonded together with silicone rubber compressibly fitted around the sleeves between the radial flanges with one sidewall rim edge inserted into the annular recess.

References Cited in the file of this patent

UNITED STATES PATENTS

| Number | Name | Date |
|---|---|---|
| 2,126,505 | Risser | Aug. 9, 1938 |
| 2,360,830 | Denman | Oct. 24, 1944 |
| 2,505,631 | Webster | Apr. 25, 1950 |

FOREIGN PATENTS

| Number | Country | Date |
|---|---|---|
| 502,643 | Great Britain | Mar. 22, 1939 |